United States Patent [19]

Schlachter

[11] Patent Number: 4,982,758

[45] Date of Patent: Jan. 8, 1991

[54] REGULATOR WITH FLUID SUPPORTED AND OPERATED DIAPHRAGM

[75] Inventor: Leo J. Schlachter, Edgerton, Ohio

[73] Assignee: The ARO Corporation, Bryan, Ohio

[21] Appl. No.: 472,105

[22] Filed: Jan. 30, 1990

[51] Int. Cl.$^5$ .................................................. G05D 16/08
[52] U.S. Cl. .................................... 137/505.42; 251/57
[58] Field of Search ....................... 137/505.42, 505.16, 137/559, 312; 251/57

[56] References Cited

U.S. PATENT DOCUMENTS

| | | | |
|---|---|---|---|
| 2,320,886 | 6/1943 | Quiroz | 251/57 X |
| 2,981,281 | 4/1961 | Peras | 137/505.42 X |
| 3,045,690 | 7/1962 | Nickells | 251/57 X |
| 4,840,195 | 6/1989 | Zabrenski | 137/312 |

Primary Examiner—Stephen M. Hepperle
Attorney, Agent, or Firm—Allegretti & Witcoff, Ltd.

[57] ABSTRACT

A diaphragm operated pressure regulator has a housing with a flow passage therethrough. The diaphragm in the housing is operatively connected to a ball valve in the flow passage for positioning the ball valve to control fluid flow through the flow passage at a predetermined pressure value. The diaphragm cooperates with the housing to define a displacement chamber. The displacement chamber is filled with fluid for backing up the diaphragm over its entire surface exposed to the displacement chamber. The diaphragm is preferably not perforated. A displacement piston cooperates with the displacement chamber to control the force applied to the diaphragm and thereby the flow through the flow passage. The displacement piston is adjustable into and out of the displacement chamber to vary the force applied to the diaphragm.

4 Claims, 1 Drawing Sheet

REGULATOR WITH FLUID SUPPORTED AND OPERATED DIAPHRAGM

BACKGROUND OF THE INVENTION

This invention relates to a diaphragm-operated pressure regulator and more particularly to a fluid medium arrangement for backing said diaphragm.

In the prior art, it is known to provide a diaphragm in a pressure regulator with a metal backup plate for supporting the diaphragm. The backup plate is ordinarily considerably smaller in area than the diaphragm. During operation of the pressure regulator, there is unequal pressure on the diaphragm which causes a breakdown, or shearing action at the outside edges of the backup plate.

An object of the present invention is to provide a pressure regulator having a diaphragm operator for controlling a valve means in the flow passage through the pressure regulator wherein the disadvantages and deficiencies of prior pressure regulators with a metal backup plate for the diaphragm are obviated.

Another object of this invention is to provide an improved diaphragm-operated pressure regulator with fluid backup means for the diaphragm.

Yet another object of this invention is to provide an improved diaphragm-operated pressure regulator with fluid backup means for the diaphragm and adjustment means for varying the fluid force applied to the diaphragm.

Other objects and advantages of the present invention will be made more apparent hereinafter.

BRIEF DESCRIPTION OF THE DRAWINGS

There is shown in the drawing a presently preferred embodiment of the present invention wherein.

DETAILED DESCRIPTION OF THE PRESENT INVENTION

Figure 1:
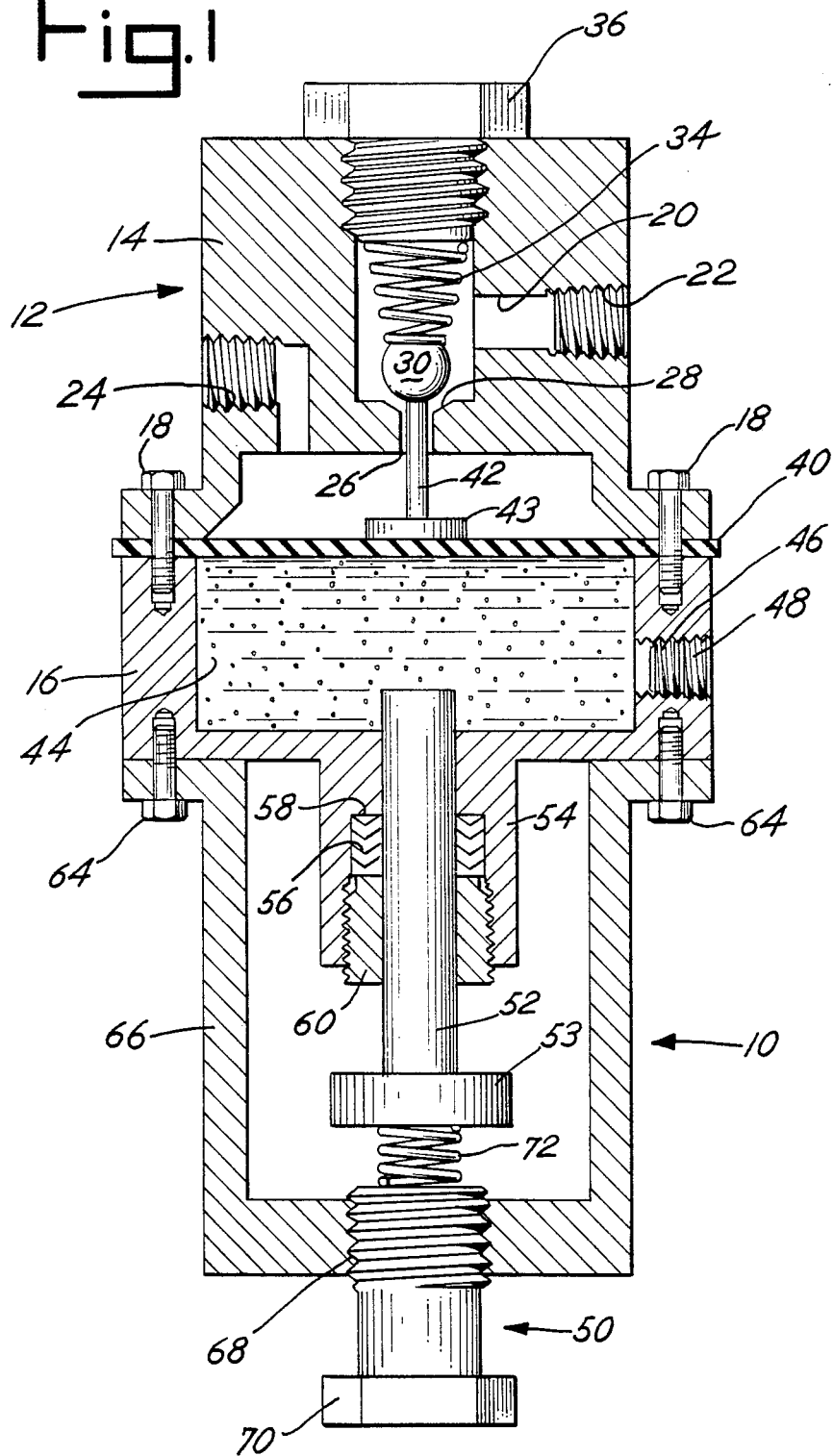
FIG. 1 is a cross-sectional view through the pressure regulator of the present invention.

The figure of drawing illustrates a presently preferred embodiment of the improved pressure regulator 10. The pressure regulator 10 includes a housing 12 having an upper casing 14 and a lower casing 16 joined to one another by suitable fastening means, for example, bolts 18.

Defined in housing 12 is a flow passage 20. The flow passage 20 communicates at one end with inlet 22 and at the other end with outlet 24. The inlet 22 and the outlet 24 are connected to suitable fluid lines, as is known in the art. The fluid controlled may be paint, glue, solvent or a like material. Intermediate its ends, the flow passage 20 is provided with a restricted portion 26 having a valve seat 28 at the upstream end of the restricted portion 26.

A ball valve 30 is provided in the flow passage 20 for cooperating with the valve seat 28 to control the flow of fluid through the flow passage 20. The ball value 30 is a common valve type, however, other types of valves may be used within the scope of the present invention. The fluid may be a gas or air or liquid, as noted above. A spring 34 is disposed between the ball valve 30 and a threaded plug 36 connected to upper casing 14 for biasing the ball valve 30 toward the valve seat 28 to restrict the flow through the flow passage 20.

A flexible diaphragm 40, which is formed from a suitable resilient material such as rubber or a wafer-type material diaphragm, is clamped between the upper casing 14 and the lower casing 16. The upper surface of the diaphragm 40 as shown in the drawing defines a wall of the flow passage 20. The diaphragm 40 could also be fabricated from stainless steel, brass or plastic such as polytetrafluoroethylene. These materials could be formed in a convoluted form to allow for flexibility. In the event a metal diaphragm were used, the enlarged head 43 of the push rod 42 could be soldered or otherwise affixed to the diaphragm 40.

Operatively connecting the diaphragm 40 to the ball valve 30 is a push rod 42 for displacing and positioning the ball valve 30 in the flow passage 20.

The diaphragm 40 cooperates with the lower casing 16 to define a chamber 44 for receiving a displacement fluid for backing up the diaphragm. The fluid is introduced into chamber 44 through the fill opening 46 in the lower casing. When the chamber 44 is filled, plug 48 is positioned in fill opening 46 to close same. The fill opening 46 may be threaded and the plug 48 may be threaded in a complementary manner to seal the fluid in chamber 44. The displacement fluid is preferably a light oil or a solvent that is compatible with the fluid in the flow passage 20. The displacement fluid could be clear or an appropriate color could be added. Preferably the color of the displacement fluid would contrast with the color of the fluid being regulated in the flow passage 20. For example, if the fluid being regulated is a yellow glue, the displacement fluid could be a white or clear oil. If the regulated fluid mixed with the displacement fluid, there would be a change of color. A suitable observation window could be provided in the outside wall of the chamber 44 to observe the displacement fluid in chamber 44. A change in color of the fluid in the chamber 44 would indicate that the diaphragm 40 had failed.

Another advantage of the inventive arrangement is that in the event of regulated fluid leakage through diaphragm 40 into chamber 44, the regulated fluid would be confined or held in the pressure regulator. This is a desirable result, particularly if the regulated fluid were caustic, poisonous or like undersirable or dangerous fluid. The operator noting a color change in the fluid in chamber 44 would know that the diaphragm 40 is leaking. Also, since there was no external leakage, the operator could keep the pressure regulator 10 in service a short period of time until it was convenient to repair or replace the pressure regulator 10.

Adjusting means 50 are provided for adjusting the pressure applied to diaphragm 40 for controlling the flow through said flow passage at a predetermined value. The adjusting means 50 includes a displacement piston 52 adapted to be moved into and out from the chamber 44. The piston 52 is guided for linear movement by a sleeve 54 projecting downwardly from the lower casing 16 as seen in the drawing. Retained about the piston 52 in the sleeve 54 for sealing the fluid in chamber 44 is a packing 56. The packing 56 may comprise a V-packing as shown, or O-rings or similar sealing devices may be used. The V-packing 56 is held in position against a shoulder 58 in the sleeve 54 by a retaining nut 60 that is threaded into the lower end of sleeve 54. Preferably the displacement fluid in chamber 44 is a clean, non-corrosive, non-abrasive material that will extend the life of the packing or seal means 56.

Secured to the lower casing 16 by suitable fastening means, for example, bolts 64 is a yoke 66. In the lower end or base of the yoke 66 as viewed in the drawing, there is provided a threaded opening 68 for receiving an adjustment stud 70. The adjustment stud 70 has external threads which cooperate with the internal threads in opening 68 to provide for movement of the adjustment stud 70 inwardly or outwardly from the yoke 66. A spring 72 is disposed between the adjustment stud 70 and the displacement piston 52 for biasing the displacement piston 52 inwardly with respect to chamber 44.

Rotation of the adjustment stud 70 inwardly with respect to the yoke 66, will increase the pressure applied by spring 72 against the head 53 of the displacement piston 52, thus moving the displacement piston upwardly into chamber 44 and increasing the fluid force applied against diaphragm 40. The center of the diaphragm 40 will be moved upwardly to displace the push rod 42 upwardly and position ball valve 30 away from valve seat 28. The pressure regulator 10 is thus set to control a predetermined value of pressure.

The spring 34 is constructed and arranged to retain ball valve 30 in position against the upper end of push rod 42. The lower end of the push rod 42 has an enlarged head 43 for engaging the diaphragm 40 over an extended surface and obviating possible damage to the diaphragm 40 by the relatively small diameter push rod 42.

In use, fluid will flow from inlet 22 into flow passage 20, between the ball valve 30 and its seat 28, then through the restricted portion 26 of the flow passage 20, to the outlet 24.

Fluid in chamber 44 contacts the entire underside of the diaphragm 40 as viewed in the drawing, thus distributing the backup force against the diaphragm 40 and preventing breakdown and shearing of the diaphragm as may occur with prior art metal backup plates positioned centrally of the diaphragm and having a relatively small area as compared to the area of the diaphragm. Also, with a metal backup plate, the diaphragm is usually perforated or provided with a hole. The backup plate extends along one surface of the diaphragm and has a projection or rodlike member extending through an opening in the diaphragm which is adapted to be joined to a nut or like fastening member adjacent the opposed surface of the diaphragm to secure the metal backup plate in place on the diaphragm and also to seal the opening through the diaphragm. The present diaphragm 40 is not perforated in its central area, thus obviating a possible leakage problem.

There has been provided by the present invention an improved pressure regulator having a diaphragm operator with fluid backup means, rather than a metal or like rigid backup plate. Fluid is used to operate and support the diaphragm. Pressure is equalized on both sides of the diaphragm. This will eliminate the breakdown or shearing action on the diaphragm caused by prior art rigid backup plates. Also, the present arrangement will help dampen out some of the valve chatter inherent in some regulators.

The piston and diaphragm areas are sized so that advantages in spring force and adjustment forces are realized. The piston and spring are sized so as to provide for more sensitive adjustment. For example, by reducing the cross-sectional area of piston 52, the size of spring 72 can be reduced.

The pressure regulator may be a high pressure regulator or low pressure regulator. The fluid controlled may be air or another gas or it could be a liquid, such as paint, glue, solvent, or a like flowable material. The invention could also be applied to a back pressure type pressure regulator that controls pressure upstream of the valve, rather than a downstream model as described in this application that regulates pressure downstream of the pressure regulator. As is known in the art, a back pressure model allows inlet pressure to enter the diaphragm cavity. The valve is located on the same side of the diaphragm in the diaphragm cavity. If the pressure in the diaphragm cavity is increased, the valve relieves the excess pressure over a predetermined value by passing the fluid through the valve.

While a displacement piston arrangement has been shown for controlling the displacement fluid pressure in the regulator, it will be recognized by those skilled in the art that a pump, or other pressure source, could be used instead of the displacement piston arrangement. The pressure regulator can be remotely controlled and monitored. This is useful if the regulator were located in a pit or any place that is inconvenient to adjust and monitor the regulator. Also, this is useful for regulating hazardous fluids, or if the pressure regulator is used in a hazardous or dangerous location.

While I have shown and described a presently preferred embodiment of the present invention, it is understood that the same is by way of illustration and example only and is not to be taken by way of limitation. The spirit and scope of the present invention are limited only by the terms of the appended claims and their proper equivalents.

I claim:

1. A pressure regulator comprising a housing having a fluid flow passage therethrough with a fluid inlet at one end of the flow passage and a fluid outlet at the other end of said flow passage, valve means in said housing for controlling the flow of fluid through said flow passage, diaphragm means in said housing for actuating the valve means including an actuator operatively connected to the valve means for moving same, said diaphragm means cooperating with said housing to define a displacement chamber in said housing, a displacement fluid filling said chamber and being in contact with and backing said diaphragm means, a displacement piston adopted to be moved into and out of the displacement chamber in the housing to control the force applied to the diaphragm means for controlling the flow of fluid through the flow passage at a predetermined value, an adjustment screw on the housing cooperative with the displacement piston for adjusting the position of same, and a spring between the adjustment screw and the displacement piston.

2. A pressure regulator as in claim 1 including spring means for biasing the valve means toward a closed position.

3. A pressure regulator as in claim 1 wherein the displacement fluid is a contrasting color to the color of the fluid in the flow passage, whereby a change of color of the displacement fluid would indicate a leak in the diaphragm means.

4. A pressure regulator as in claim 1 wherein the piston is slidably received through a sleeve in the housing and projects into the chamber, and seal means surrounding the piston, said piston, sleeve, spring, adjusting screw and seal means all coaxial with each other and with the valve means.

* * * * *